(12) United States Patent
Sakai (10) Patent No.: US 12,502,721 B2
(45) Date of Patent: Dec. 23, 2025

(54) BAND SAW MACHINE, METHOD OF COOLING BAND SAW BLADE, AND METHOD OF CUTTING WORKPIECE BY BAND SAW MACHINE

(71) Applicants: AMADA CO., LTD., Kanagawa (JP); AMADA MACHINERY CO., LTD., Kanagawa (JP)

(72) Inventor: Norihisa Sakai, Kanagawa (JP)

(73) Assignees: AMADA CO., LTD., Kanagawa (JP); AMADA MACHINERY CO., LTD., Kanagawa (JP)

( * ) Notice: Subject to any disclaimer, the term of this patent is extended or adjusted under 35 U.S.C. 154(b) by 268 days.

(21) Appl. No.: 18/033,979

(22) PCT Filed: Nov. 4, 2021

(86) PCT No.: PCT/JP2021/040540
§ 371 (c)(1),
(2) Date: Apr. 26, 2023

(87) PCT Pub. No.: WO2022/097669
PCT Pub. Date: May 12, 2022

(65) Prior Publication Data
US 2023/0398616 A1 Dec. 14, 2023

(30) Foreign Application Priority Data
Nov. 9, 2020 (JP) .................................. 2020-186458

(51) Int. Cl.
*B23D 59/04* (2006.01)
*B23D 55/06* (2006.01)

(52) U.S. Cl.
CPC .......... *B23D 59/04* (2013.01); *B23D 55/065* (2013.01)

(58) Field of Classification Search
CPC ............................. B23D 55/065; B23D 59/04
See application file for complete search history.

(56) References Cited

U.S. PATENT DOCUMENTS

| | | | | |
|---|---|---|---|---|
| 1,390,469 A | * | 9/1921 | Stowell | B23D 55/088 83/543 |
| 1,908,727 A | * | 5/1933 | Bleam | B23Q 11/005 29/DIG. 96 |

(Continued)

FOREIGN PATENT DOCUMENTS

| | | |
|---|---|---|
| JP | 2001-170817 A | 6/2001 |
| JP | 2004-283938 A | 10/2004 |
| JP | 2011-025384 A | 2/2011 |

OTHER PUBLICATIONS

International Search Report for corresponding Application No. PCT/JP2021/040540, mailed Dec. 28, 2021.
(Continued)

*Primary Examiner* — Sean M Michalski
(74) *Attorney, Agent, or Firm* — Renner, Otto, Boisselle & Sklar, LLP (57) ABSTRACT

A band saw machine includes a first wheel and a second wheel arranged lower than the first wheel, the first wheel and the second wheel being configured to apply a tension to a band saw blade for tracking, a first supply unit arranged between a lowermost end of the second wheel and a workpiece cutting position along a travelling direction from the second wheel toward the first wheel in a rotary travel path of the band saw blade and configured to spray a cutting fluid in a mist or to drop the cutting fluid onto a tooth part of the band saw blade, and a second supply unit arranged between the workpiece cutting position to the second wheel and configured to pour or spray the cutting fluid or a fluid for cooling over the band saw blade.

3 Claims, 7 Drawing Sheets

(56) References Cited

U.S. PATENT DOCUMENTS

| | | | | |
|---|---|---|---|---|
| 1,916,596 | A * | 7/1933 | Winfree, Jr. | B26D 7/088 83/168 |
| 2,529,249 | A * | 11/1950 | Flood | F16N 15/00 184/65 |
| 2,815,562 | A * | 12/1957 | Wilkie | B23D 59/04 83/171 |
| 2,865,412 | A * | 12/1958 | Crane | B23D 55/065 83/523 |
| 2,992,663 | A * | 7/1961 | Hendrickson | B23D 59/04 83/171 |
| 3,097,675 | A * | 7/1963 | Benedict | B23D 59/04 83/169 |
| 3,530,752 | A * | 9/1970 | Tsuneo | B23D 55/082 83/820 |
| 3,557,848 | A * | 1/1971 | Wright | B27B 33/06 83/820 |
| 4,222,295 | A * | 9/1980 | Sawamura | B23D 59/04 83/794 |
| 4,487,340 | A * | 12/1984 | Shaffer | B23Q 11/1084 417/259 |
| 4,597,697 | A * | 7/1986 | Shaffer | B23Q 11/1038 408/61 |
| 4,608,892 | A * | 9/1986 | Noizet | B26D 7/088 83/788 |
| 4,660,454 | A * | 4/1987 | Elsey | B27B 15/02 83/661 |
| 4,727,785 | A * | 3/1988 | Taguchi | B23Q 11/0057 83/788 |
| 6,021,772 | A * | 2/2000 | Seifert | B28D 1/127 83/100 |
| 6,968,764 | B2 * | 11/2005 | Gorun | B26D 7/088 83/100 |
| 7,823,491 | B2 * | 11/2010 | Chaffin | B26D 7/088 83/788 |
| 9,561,553 | B2 * | 2/2017 | Waida, Jr. | B23D 53/08 |
| 2005/0039587 | A1 * | 2/2005 | Gorun | B26D 7/088 83/788 |
| 2005/0081690 | A1 * | 4/2005 | Biro | B23D 59/006 83/788 |
| 2009/0255390 | A1 * | 10/2009 | Chaffin | B23D 59/04 83/788 |
| 2015/0053196 | A1 * | 2/2015 | Bennett | B23D 61/185 125/21 |
| 2015/0273598 | A1 * | 10/2015 | Waida, Jr. | B23D 55/02 83/788 |

OTHER PUBLICATIONS

Written Opinion for corresponding Application No. PCT/JP2021/040540, mailed Dec. 28, 2021.
Extended European Search Report for corresponding EP Application No. 21889222.2 dated Feb. 8, 2024.

* cited by examiner

BAND SAW MACHINE, METHOD OF COOLING BAND SAW BLADE, AND METHOD OF CUTTING WORKPIECE BY BAND SAW MACHINE

TECHNICAL FIELD

The present invention relates to a band saw machine, a method of cooling a band saw blade, and a method of cutting a workpiece by the band saw machine.

BACKGROUND ART

As methods of supplying cutting oil in a cutting process, a wet method in which the cutting oil is supplied abundantly to a cutting tool and an MQL (Minimum Cutting Lubrication) method in which the cutting oil is supplied to the cutting tool in a mist so that an amount to be used is minimized as described in Patent Literature 1 are known. The MQL method is also referred to as a semi-dry method or a mist method.

Patent Literature 2 describes a cutting process device that performs a cutting process by a band saw blade in the semi-dry method.

CITATION LIST

Patent Literature

Patent Literature 1: Japanese Patent Application Laid-Open Publication No. 2011-025384
Patent Literature 2: Japanese Patent Application Laid-Open Publication No. 2004-283938

SUMMARY

Since the amount of the cutting oil to be used in the semi-dry method is extremely small, a product to which the cutting oil hardly adheres can be obtained in the cutting process by the band saw blade. Therefore, the post-treatment man-hours for product cleaning and the like are small, and the working environment in which the product is handled can be maintained in a good environment with little oil stains. Note that the semi-dry method or the mist method is a method in which an object is covered with a dry mist, and refers to a method in which the cutting oil formed in a mist or mist-like fine particles is sprayed onto the object.

On the other hand, the cutting oil supplied to the band saw blade in the cutting process is not only a lubricating fluid for cutting but also a cooling liquid for cooling a material to be cut and the band saw blade.

In the semi-dry method, since the amount of the cutting oil to be used as the cooling liquid is smaller than that in the wet method, the cooling efficiency is lower than that in the wet method. Therefore, in the cutting process by the semi-dry method, it is necessary to suppress the cutting speed so that the temperature of the band saw blade does not excessively rise and the life thereof is not shortened. For this reason, in the cutting process by the semi-dry method, a contrivance is desired for improving the process efficiency by enabling the cutting process at a higher speed.

According to one aspect of the present invention, it is possible to provide a band saw machine, a method of cooling a band saw blade, and a method of cutting a workpiece by the band saw machine that enable a cutting process by a semi-dry method at a higher speed.

Solutions to Problem

One aspect of the present invention has the following configurations and procedures.

1) A band saw machine, which includes a first wheel and a second wheel arranged lower than the first wheel, the first wheel and the second wheel being configured to apply a tension to a band saw blade for correct tracking, a first supply unit arranged between a lowermost end of the second wheel and a workpiece cutting position along a travelling direction from the second wheel toward the first wheel in a rotary travel path of the band saw blade and configured to spray a cutting fluid formed in a mist or to drop the cutting fluid onto a tooth part of the band saw blade, and a second supply unit arranged between the workpiece cutting position and the second wheel and configured to pour or spray the cutting fluid or a fluid for cooling over the band saw blade.

2) The band saw machine according to 1), which further includes a removal unit arranged in a section of the band saw blade from a contact end edge of the second wheel to a contact start edge of the first wheel and arranged between the contact end edge of the second wheel and the first supply unit in the rotary travel path of the band saw blade, the removal unit being configured to remove a deposit adhering to the band saw blade.

3) The band saw machine according to 2), in which the removal unit is configured to remove the deposit by relatively sliding a scraper or by spraying a gas that does not contain the cutting fluid with respect to a surface of the band saw blade that is traveling.

4) A method of cooling a band saw blade to which a tension is applied for correct tracking by a first wheel and a second wheel arranged lower than the first wheel, the method including cooling the band saw blade by spraying a cutting fluid formed in a mist onto a tooth part of the band saw blade between a lowermost end of the second wheel and a workpiece cutting position along a travelling direction from the second wheel toward the first wheel in a rotary travel path of the band saw blade, and cooling the band saw blade by pouring the cutting fluid over or spraying a gas that does not contain the cutting fluid onto the band saw blade between the workpiece cutting position and the second wheel.

5) A method of cutting a workpiece by a band saw machine including a first wheel and a second wheel arranged lower than the first wheel, the first wheel and the second wheel being configured to apply a tension to a band saw blade for correct tracking, the method including cooling the band saw blade by spraying a cutting fluid formed in a mist or dropping the cutting fluid onto a tooth part of the band saw blade at a first supply unit between a lowermost end of the second wheel and a workpiece cutting position along a travelling direction from the second wheel toward the first wheel in a rotary travel path of the band saw blade, cooling the band saw blade by pouring or spraying the cutting fluid or a fluid for cooling over the band saw blade at a second supply unit between the workpiece cutting position and the second wheel, and removing a deposit adhering to the band saw blade by a scraper provided in a section from a contact end edge of the second wheel to a contact start edge of the first wheel and from the contact end edge of the second wheel to the first supply unit.

According to one aspect of the present invention, it is possible to obtain an effect that a cutting process by a semi-dry method is enabled at a higher speed while the band saw blade is sufficiently cooled.

DESCRIPTION OF EMBODIMENT

Figure 1:
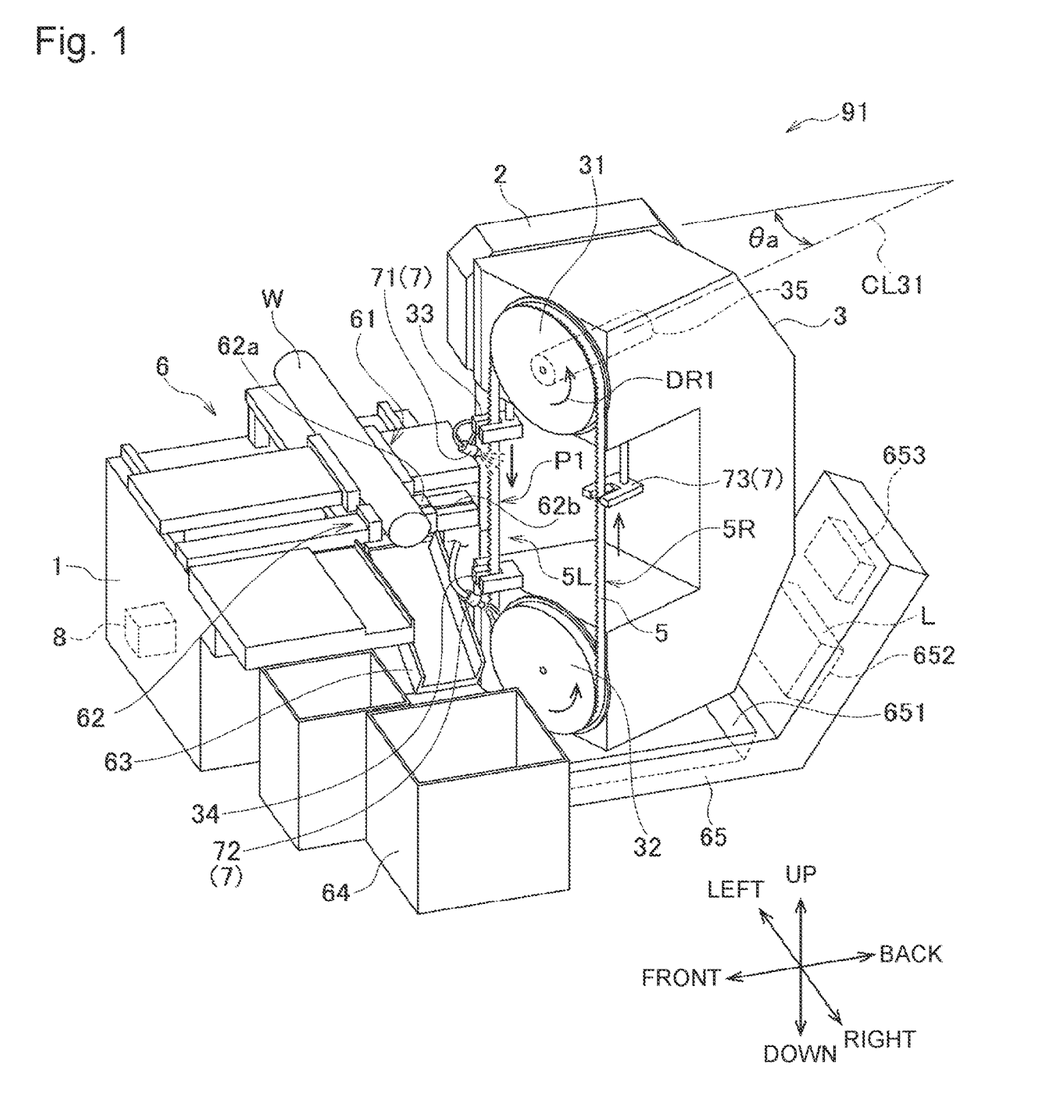
FIG. 1 is a schematic perspective view showing a state before a cutting process of a band saw machine 91 according to an embodiment of the present invention.
Figure 2:
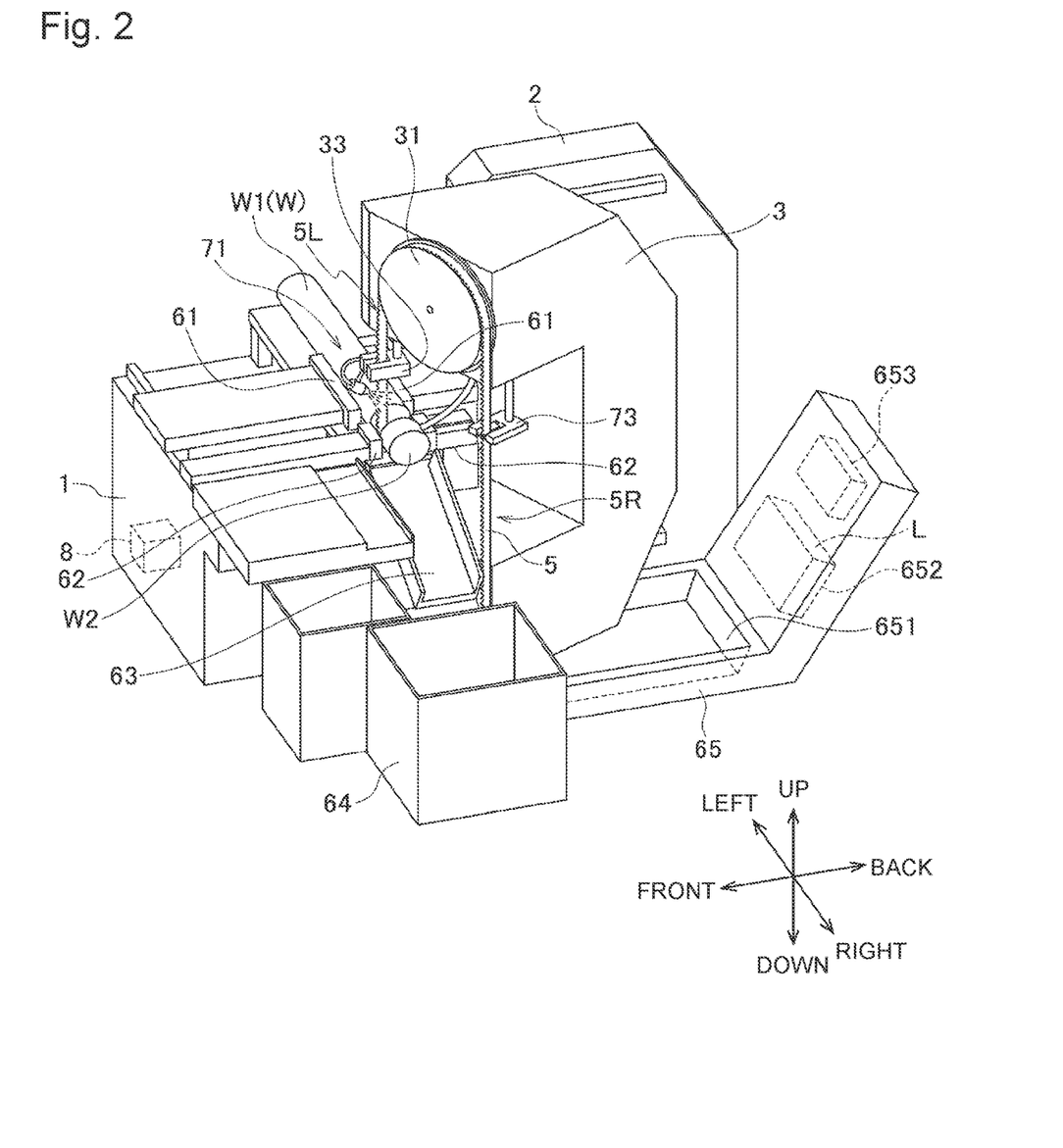
FIG. 2 is a schematic perspective view showing a state immediately after the cutting process of the band saw machine 91.

FIGS. 1 and 2 are perspective views showing a band saw machine 91 according to an embodiment of the present invention. FIG. 1 shows a state before a workpiece W is cut, and FIG. 2 shows a state immediately after the cutting of the workpiece W is completed. In FIGS. 1 and 2, a front-back direction, a left-right direction, and an up-down direction are respectively defined by directions indicated by the arrows. The front-rear direction and the left-right are directions respectively specified for convenience of explanation, and do not specify the posture of the band saw machine and the like. The left-right direction corresponds to the direction of gravity (the top and bottom direction) in a normal installation posture of the band saw machine 91.

As shown in FIG. 1, the band saw machine 91 is of a stationary vertical type, and is of a type in which a band saw blade 5 is twisted to cut the workpiece W so that a long object can be cut. The band saw machine 91 includes a main body unit 1, a base support unit 2, a cutting base 3, a workpiece support unit 6, and a cutting oil handling unit 7.

The main body 1 is a part that serves as a base body of the band saw machine 91, which integrally supports the base support unit 2 and the workpiece support unit 6 and includes a control unit 8 that controls an operation of a shooter 63, a product box 64, a tank unit 65, and the band saw machine 91.

The base support unit 2 includes an unillustrated drive unit and is a part upright with respect to the workpiece support unit 6. The base support unit 2 moves the cutting base 3 in the front-rear direction with respect to the workpiece support unit 6 or the workpiece W by an operation of the drive unit.

The cutting base 3 includes an upper wheel 31 that is a first wheel and a lower wheel 32 that is a second wheel arranged vertically apart from each other. The upper wheel 31 is a drive wheel and the lower wheel 32 is a driven wheel, for example.

An axis of the lower wheel 32 is parallel to an axis CL31 of the upper wheel 31, and the axis CL31 is set as a line that is horizontal and whose front side is inclined to the right at an angle θa with respect to the front-rear direction.

A tension is applied to the band saw blade 5 at the upper wheel 31 and the lower wheel 32 so as to correctly track the band saw blade 5 by adjustment. For example, a position in the axial direction of the upper wheel 31 with respect to the lower wheel 32 is adjusted to correctly track the band saw blade 5. The band saw blade 5 includes a band-shaped body part 5a and a tooth part 5b formed on one end of the body part 5a, and is adjusted and tracked, by the upper wheel 31 and the lower wheel 32, in an orientation in which the tooth part 5b is a front side.

The cutting base 3 includes a wheel drive unit 35 that causes the upper wheel 31, which is the drive wheel, to rotate in a predetermined direction. In FIG. 1, by an operation of the wheel drive unit 35, the upper wheel 31 rotates around the axis CL31 in the counterclockwise direction indicated by an arrow DR1 in FIG. 1.

As a result, a state is generated in which the upper wheel 31 and the lower wheel 32 can track the band saw blade 5, and in a pair of portions at which the band saw blade 5 extends between the upper wheel 31 and the lower wheel 32, a left side path 5L on the left side travels downward as a first path and a right side path 5R, which is on the right side, travels upward as a second path.

The cutting base 3 includes a pair of twist units 33 and 34 that raise a part of the left side path 5L, which travels downward of the band saw blade 5, in a twisting manner. The twist units 33 and 34 each has an unillustrated twisting roller. The tooth part 5b of the band saw blade 5 is directed toward the workpiece W by the twist units 33 and 34.

Specifically, in the left side path 5L, the band saw blade 5 is delivered downward from the upper wheel 31 in an orientation in which a surface thereof is inclined at the angle θa with respect to the front-rear direction. Then, the band saw blade 5 is lowered after forcibly twisted by the angle θa in a direction in which the surface thereof faces in the front-rear direction by the twisting roller of the twist unit 33, and is twisted back by the angle θa by the twisting roller of the twist unit 34. The angle θa is 90° or less, and is, for example, 450.

The workpiece W is cut by sawing with the band saw blade 5, which is twisted so as to extend in the front-rear direction between the twist unit 33 and the twist unit 34. Therefore, a cut surface of the workpiece W is a surface orthogonal to the longitudinal direction of the workpiece W.

The cutting base 3 moves in the front-rear direction between a standby position shown in FIG. 1 and a process end position shown in FIG. 2 by the operation of the drive unit of the base support unit 2.

The workpiece support unit 6 includes a workpiece vise 61 and a product vise 62. The workpiece vise 61 holds and maintains, in the front-rear direction, the workpiece W such as a bar material supplied to the band saw machine 91 in a posture extending from the left side in the left-right direction. The product vise 62 is arranged on a movement path of the left side path 5L of the band saw blade 5 in the front-rear movement of the cutting base 3, and holds and maintains the workpiece W so as to straddle a sawing position to the left and right.

A vise 62a on a rear side of the product vise 62 is formed with a slit 62b extending in the front-rear direction. The left side path 5L of the band saw blade 5 moves in the slit 62b at the time of a cutting process.

The basic operation in the cutting process of the band saw machine 91 is as follows. The workpiece W is a long round bar.

First, as shown in FIG. 1, the workpiece W is held and positioned by the workpiece vise 61 and the product vise 62 such that the sawing position is a position corresponding to a length of the product.

Next, the wheel drive unit 35 is operated to rotate and travel the band saw blade 5. Further, the cutting base 3 is moved forward toward a cutting completion position shown in FIG. 2.

The left side path 5L of the band saw blade 5 moves in the slit 62b of the vise 62a and cuts the workpiece W, which is maintained in the posture extending to the left and right, by sawing from the rear end side of the sawing position so as to separate a product W2 as shown in FIG. 2.

The product W2 naturally falls by its own weight toward the shooter 63 arranged below when a pinching by the product vise 62 is released.

The shooter 63 is arranged in a posture inclined toward the lower right, and a product box 64 is placed below at the right end portion. As a result, the product W2 that has fallen on the shooter 63 slides down on the shooter 63, and falls into the product box 64 from the right end so as to be stored.

The cutting oil handling unit 7 includes at least a first supply unit 71 and a second supply unit 72. The cutting oil handling unit 7 of the band saw machine 91 shown in FIGS. 1 and 2 further includes a removal unit 73.

The tank unit 65 includes a storage unit 652 that stores a cutting oil L that is a cutting fluid supplied to the band saw blade 5, a collection unit 651 that collects the cutting oil L used for lubricating during the process and cooling the band saw blade 5 as well as chips generated due to the process, and a delivery pump 653 that delivers the cutting oil L stored in the storage unit 652 toward the first supply unit 71 and the second supply unit 72. However, the cutting oil L or a gas that does not contain the cutting oil may be supplied to the first supply unit 71 and the second supply unit 72 from a supply source different from the delivery pump 653, or the gas that does not contain the cutting oil may be supplied to the removal unit 73. Further, in lieu of the gas that does not contain the cutting oil, a fluid such as a coolant fluid may be supplied to the second supply unit 72 as a fluid for cooling.

Note that the first supply unit 71 is provided mainly for the purpose of supplying the cutting oil L to a tooth tip of the tooth part 5b of the band saw blade 5 to an extent that the workpiece W is not wet, and the second supply unit 72 is provided mainly for the purpose of cooling the tooth part 5b and the body part 5a of the band saw blade 5. Therefore, since the expectations and effects in which the above-mentioned fluids including the cutting fluid and the gas contribute to the band saw blade 5 are different from each other, a designer can select those fluids according to the intention.

The cutting oil handling unit 7 will be described in detail with reference to FIGS. 1 and 3 to 5.

Figure 3:
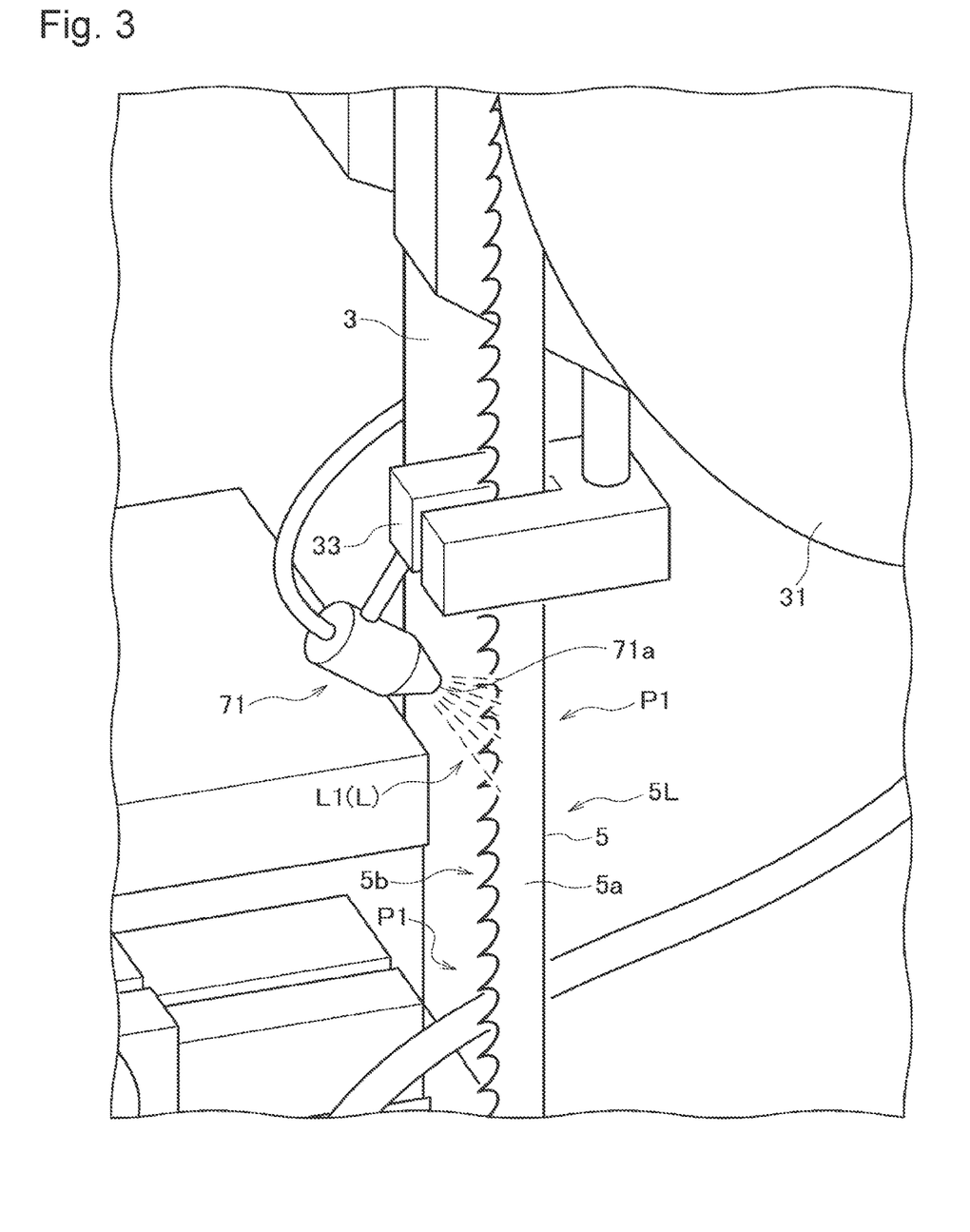
FIG. 3 is a perspective view showing a first supply unit 71 provided to the band saw machine 91.
Figure 4:
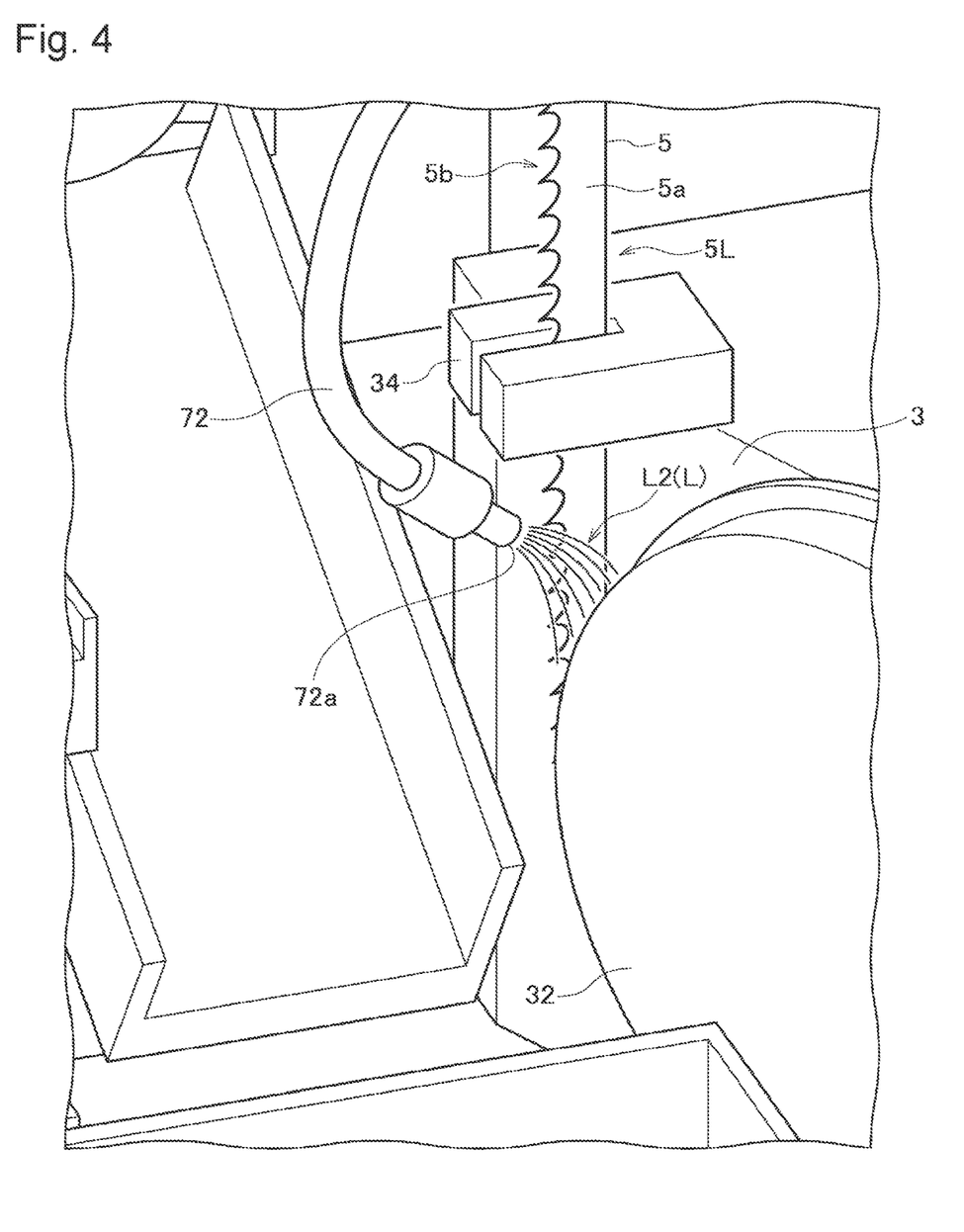
FIG. 4 is a perspective view showing a second supply unit 72 provided to the band saw machine 91.
Figure 5:
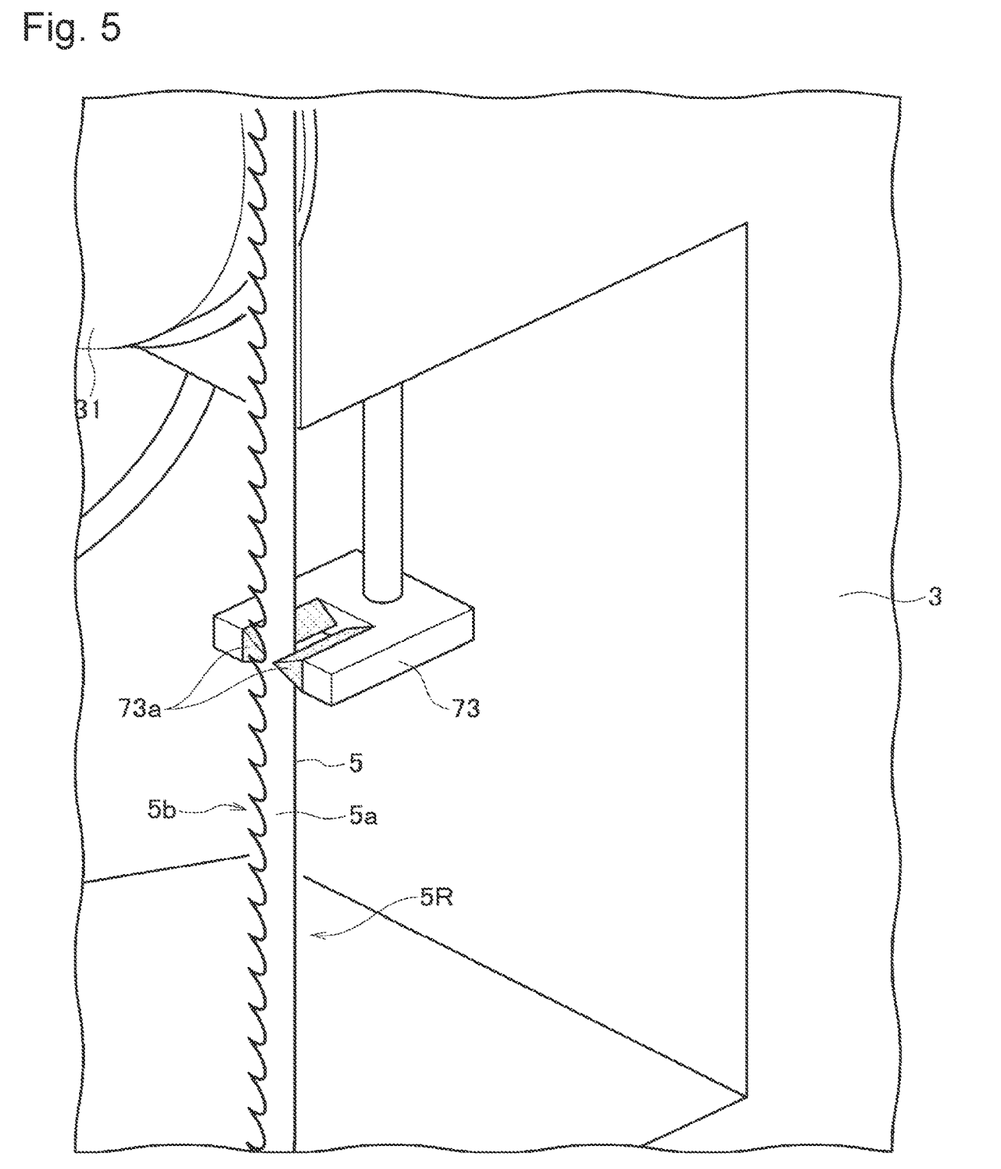
FIG. 5 is a perspective view showing a removal unit 73 provided to the band saw machine 91.

FIG. 3 is an enlarged perspective view showing the first supply unit 71 and a part in a vicinity thereof in FIG. 1. FIG. 4 is an enlarged perspective view showing the second supply unit 72 and a part in a vicinity thereof in FIG. 1. FIG. 5 is an enlarged perspective view showing the removal unit 73 and a part in a vicinity thereof in FIG. 1.

As shown in FIGS. 1 and 3, the first supply unit 71 is attached to a side of the cutting base 3 so as to move together with the cutting base 3. The first supply unit 71 is arranged corresponding to a range (a section) between the upper wheel 31 and a sawing position P1 that is a workpiece sawing position in the left side path 5L of the band saw blade 5. The workpiece sawing position P1 is also a workpiece cutting position.

Note that the first supply unit 71 may be arranged corresponding to a range (a section) between, along the traveling direction of the band saw blade 5, a lowermost end P6 of the lower wheel 32 and the sawing position P1 that is the workpiece sawing position.

The first supply unit 71 sprays the cutting oil L as a mist L1, which is obtained by forming the cutting oil L in a mist, onto the band saw blade 5 for lubrication and cooling. The cutting oil L may be either a water-insoluble cutting oil or a water-soluble cutting oil. Note that the first supply unit 71 may supply the cutting fluid L by dropping it onto the tooth tip in lieu of forming the cutting oil L as the mist L1 and supplying it to the tooth tip of the tooth part 5b of the band saw blade 5. The amount of the cutting oil L or the cutting fluid to be supplied by the first supply unit 71 to the tooth tip is such that they serve as a lubricating fluid to moisten the tooth tip, which is a degree allowing the cutting by a semi-dry method, and a very small amount is sufficient as compared with a wet method.

Specifically, the first supply unit 71 includes an ejection port 71a that ejects, as the mist L1, the cutting oil L supplied from the delivery pump 653. The ejection port 71a is arranged so as to be close to and facing the front of the tooth part 5b of the band saw blade 5. The mist L1 ejected from the ejection port 71a mainly adheres to the tooth part 5b of the band saw blade 5.

The amount of the cutting oil L that adheres to the tooth part 5b by a mist spraying from the first supply unit 71 is adjusted and set in advance to the extent that the cutting process of the workpiece W can be satisfactorily executed and the cutting oil L does not substantially remain on the product W2 obtained by the process.

In this manner, the band saw blade 5 cuts the workpiece W with a minute amount of the cutting oil L adhering to the tooth part 5b due to the mist L1 from the first supply unit 71. In other words, the cutting process by the semi-dry method is executed.

As shown in FIGS. 1 and 4, the second supply unit 72 is attached to the side of the cutting base 3 so as to move together with the cutting base 3. The second supply unit 72 is arranged corresponding to a range between the sawing position P1 and the lower wheel 32 in the left side path 5L of the band saw blade 5. The second supply unit 72 pours the cutting oil L as a fluid flow L2 over the band saw blade 5.

Specifically, the second supply unit 72 is formed in a pipe shape, for example, and includes a discharge port 72a at a tip thereof. The discharge port 72a is arranged so as to be close to and facing the front of the tooth part 5b of the band saw blade 5. The second supply unit 72 ejects, from the discharge port 72a, the cutting oil L supplied from the delivery pump 653 not as the mist but as the fluid flow L2 at ambient temperature or a temperature lower than the ambient temperature, and pours the fluid flow L2 so as to extend the entire width direction with respect to the band saw blade 5.

The flow rate and flow velocity of the fluid flow L2 sprayed onto the tooth part 5b are adjusted and set in advance to the extent that enables appropriate cooling of the band saw blade 5 whose temperature has been raised by the cutting process, and sufficient removing and cooling of the chips generated by the cutting process and adhering to the body part 5a and the tooth part 5b of the band saw blade 5.

As a result, the band saw blade 5 that has been heated by cutting the workpiece W in the cutting process is satisfactorily cooled by the poured fluid flow L2. Further, deposits such as the chips clinging to the body part 5a and the tooth part 5b of the band saw blade 5 are removed from the band saw blade 5 while being cooled by the poured fluid flow L2.

The fluid flow L2 that has been poured over the band saw blade 5 and the deposits that have been removed from the band saw blade 5 fall downward and are stored in the collection unit 651 of the tank unit 65.

As shown in FIG. 5, the band saw blade 5 passes through a position at which the second supply unit 72 is arranged in the left side path 5L, and then travels upward on the right side path 5R via the lower wheel 32.

The removal unit 73 is attached to the side of the cutting base 3 so as to move together with the cutting base 3. The removal unit 73 is arranged in a section between a contact end edge P4 of the lower wheel 32 and a contact start edge P5 of the upper wheel 31 in the right side path 5R.

The removal unit 73 includes a pair of scrapers 73a that come into contact with both sides of the body part 5a of the band saw blade 5, respectively. The scraper 73a is formed of a flexible rubber or the like, and relatively slides while slightly urging a surface of the body part 5a of the traveling band saw blade 5.

Due to the relative sliding of the scraper 73a with respect to the body part 5a, the residual portion of the fluid flow L2 poured from the second supply unit 72 and the deposits remaining on the surface of the body part 5a that could not be completely removed by the fluid flow L2 are scraped off by the scraper 73a and satisfactorily removed from the surface of the body part 5a. The removed cutting oil L and deposits are stored in the collection unit 651 by falling downward or the like.

Note that the removal unit 73 may spray the gas that does not contain the cutting oil to blow off the cutting oil L and the deposits in lieu of using the scraper 73a.

In the right side path 5R, even if the cutting oil L remains on the band saw blade 5 that has passed through the removal unit 73, a component that evaporates sufficiently evaporates due to a relative air flow accompanying the traveling. Therefore, the band saw blade 5 enters the left side path 5L in a state in which the surface thereof is dry.

As a result, in the subsequent first supply unit 71, the fluid flow L2 poured by the second supply unit 72 does not affect the cutting process by the semi-dry method that is performed by spraying the mist L1 onto the tooth part 5b.

As described above, since the band saw machine 91 includes the second supply unit 72, the band saw blade 5 can be satisfactorily cooled after the cutting process by the semi-dry method.

As a result, the band saw machine 91 can acquire both of the advantage that the cutting oil hardly adheres to the product obtained by the cutting process of the semi-dry method and the advantage that the cutting speed of the band saw blade 5 can be increased for improving the process efficiency.

Figure 6:
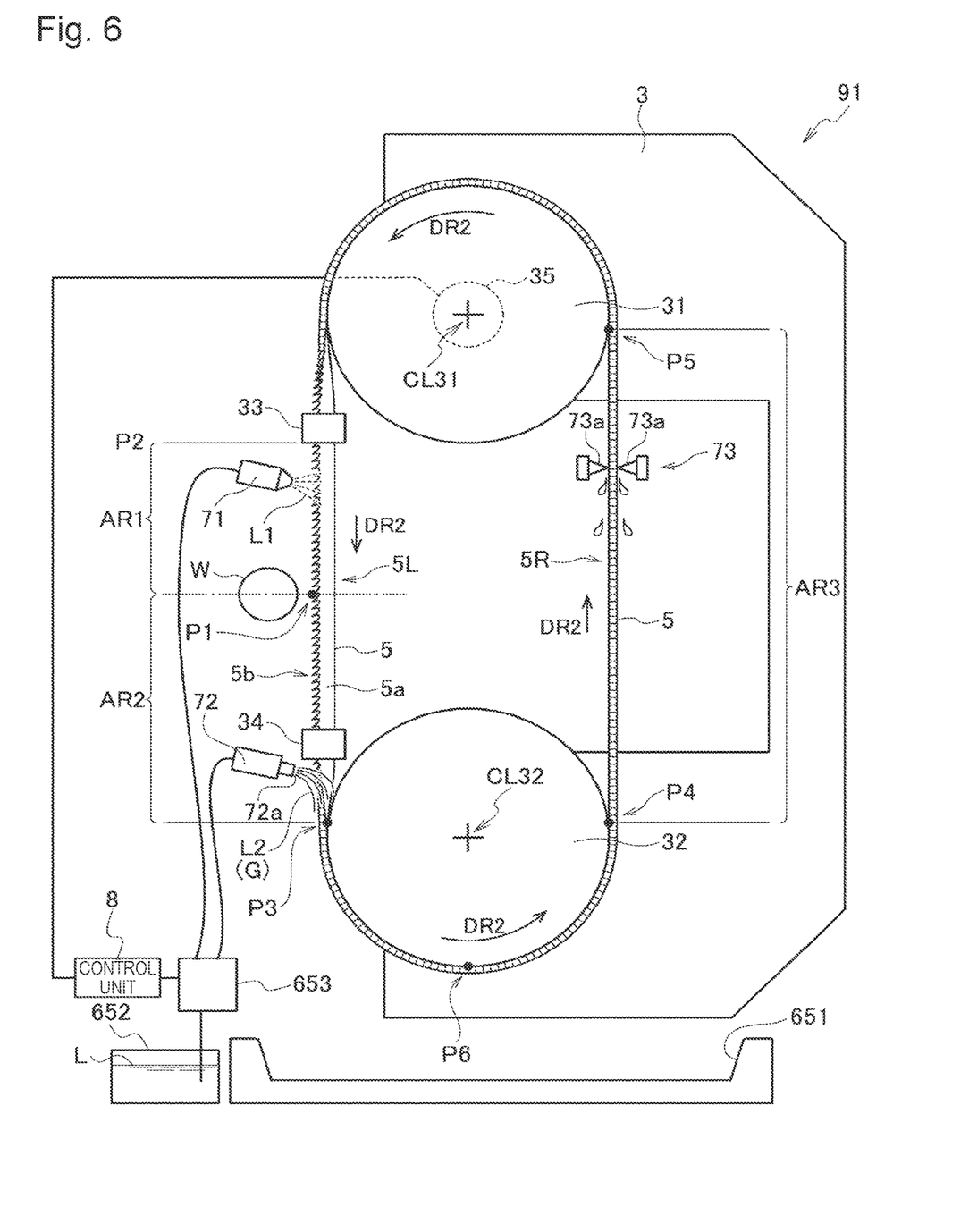
FIG. 6 is a schematic diagram for describing an arrangement position of a cutting oil handling unit 7 provided to the band saw machine 91.

FIG. 6 is a schematic view showing a traveling path of the band saw blade 5 of the band saw machine 91 and a position at which the cutting oil handling unit 7 is arranged. Hereinafter, locations at which the first supply unit 71, the second supply unit 72, and the removal unit 73, which are the cutting oil handling unit 7, will be described in detail with reference to FIG. 6.

In FIG. 6, the upper wheel 31 and the lower wheel 32 on which the band saw blade 5 is hung are shown such that their respective axes CL31 and CL32 are orthogonal to a paper surface. Further, the band saw blade 5 is shown in a state of being twisted by 90° between the twist units 33 and 34 for convenience in order to facilitate understanding and drawing.

In the cutting process, a position that first comes into contact with the workpiece W of the round bar on the rotary travel path of the band saw blade 5 is defined as the workpiece sawing position P1. Hereinafter, the workpiece sawing position P1 is simply referred to as the sawing position P1. The sawing position P1 is in the middle of the left side path 5L that is the first path. The band saw blade 5 rotates and travels while circulating in the counterclockwise direction indicated by arrows DR2 in FIG. 6 by the operation of the wheel drive unit 35.

Under the control of the control unit 8, the delivery pump 653 supplies the cutting oil L stored in the storage unit 652 to the first supply unit 71 and the second supply unit 72.

The first supply unit 71 is arranged in a range AR1 between a position P2 at the lower end of the twist unit 33 near the upper wheel 31 and the sawing position P1 on the traveling path of the band saw blade 5. The first supply unit 71 sprays, as the mist L1, the cutting oil L supplied by the delivery pump 653 onto the tooth part 5b.

It is desirable that the position of the first supply unit 71 in the range AR1 is close to the sawing position P1 so that the cutting process is performed while preventing as much as possible the cutting oil L adhering to the tooth part 5b from being scattered.

The second supply unit 72 is arranged in a range AR2 between the sawing position P1 and a position P3 at which the body part 5a comes into contact with the lower wheel 32 on the left side path 5L in the traveling path of the band saw blade 5. The second supply unit 72 pours, as the fluid flow L2, the cutting oil L supplied by the delivery pump 653 over the entire width of the band saw blade 5 including the body part 5a and the tooth part 5b.

If the position of the second supply unit 72 in the range AR2 is on a side of the lower wheel 32 side that is below the twist unit 33, it is possible to cool the band saw blade 5 and remove the deposits in a more satisfactory manner because the fluid flow L2 is not splashed onto the twist unit 33.

The removal unit 73 is installed corresponding to the right side path 5R of the band saw blade 5. Specifically, the removal unit 73 is arranged in a range AR3 (a section AR3) between a position P4 (a contact end edge P4) at which the body part 5a is separated from the lower wheel 32 and a position P5 (a contact start edge P5) at which the body part 5a comes into contact with the upper wheel 31.

Note that if the lower wheel 32 is interpreted as the most upstream position that serves as a reference so that the band saw blade 5 travels from the upstream to the downstream, the removal unit 73 may only be located on the upstream side of the supply unit 71 (the side of the lower wheel 32 on the traveling path).

When the removal unit 73 is installed at a position close to the lower wheel 32, the band saw blade 5 travels for a long distance to the position P5 while being exposed to a relative air flow, with the cutting oil L adhering to the surface being roughly scraped off by the removal unit 73. As a result, the evaporation of the evaporation component in the cutting oil L adhering to the surface of the band saw blade 5 is further promoted.

On the other hand, when the removal unit 73 is installed at a position close to the upper wheel 31, most of the cutting oil L adhering to the surface of the band saw blade 5 falls off due to its own weight while the band saw blade 5 is traveling a long distance from the position P4 to the removal unit 73. As a result, the amount of the cutting oil L that reaches the removal unit 73 is reduced. Therefore, the cutting oil L can be satisfactorily removed in the removal unit 73.

Drying of the surface of the band saw blade 5 when the band saw blade 5 is traveling on the right side path 5R is promoted as the traveling speed proportional to the cutting speed is faster. Therefore, it is preferable that the removal unit 73 is arranged at the position closer to the upper wheel 31 as the traveling speed of the band saw blade 5 is faster under the cutting process conditions.

It is preferable that the installation position of the removal unit 73 in the range AR3 is set at the optimum position so that the surface becomes sufficiently dry when the band saw blade 5 reaches the subsequent first supply unit 71 in accordance with a type of the cutting oil L and an amount of the fluid flow L2 poured over the band saw blade 5 in the second supply unit 72, a loop length of the band saw blade 5, a traveling speed of the band saw blade 5, and the like.

Depending on these conditions, the surface of the band saw blade 5 becomes sufficiently dry when the band saw blade 5 reaches the first supply unit 71 even if the removal unit 73 is not provided. In other words, the cutting oil handling unit 7 does not have to include the removal unit 73, and may only include at least the first supply unit 71 and the second supply unit 72.

The embodiment of the present invention is not limited to the configurations of the band saw machine 9 and the procedures of the method of cooling the band saw blade 5 and the method of cutting the workpiece that are described above, and may be a modification as long as it does not deviate from the summary of the present invention.

The fluid flow L2 of the cooling liquid sprayed onto the band saw blade 5 in the second supply unit 72 is not limited to the one at the ambient temperature, and may be the cooled one at a low temperature. The fluid flow L2 of the cooling liquid is not limited to oil, and may be water or a mixed fluid of water and oil. In short, the cooling flow L2 may only be a fluid such as a coolant fluid as a fluid for cooling.

As partly described above, the second supply unit 72 may spray a gas G that does not contain the cutting fluid so as to cool the band saw blade 5 by air cooling as shown by a parenthesized reference numeral in FIGS. 2 and 6 in lieu of pouring the fluid flow L2.

Figure 7:
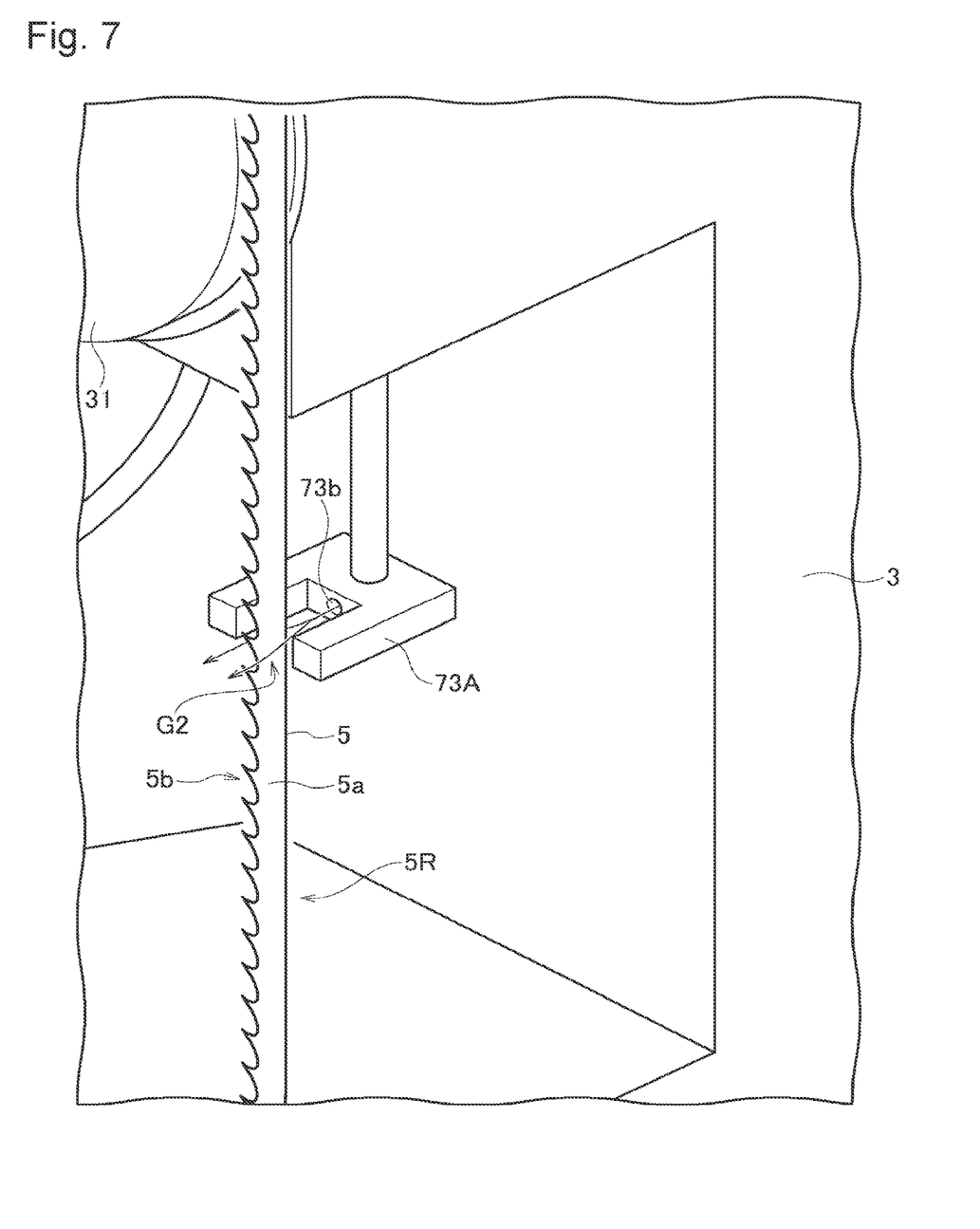
FIG. 7 is a perspective view showing a removal unit 73A, which is a modified example of the removal unit 73.

The removal unit 73 is not limited to the one that uses the scraper 73a. For example, as in a removal unit 73A of a modified example shown in FIG. 7, the removal unit 73 may be the one that sprays a high-speed gas G2 from an ejection port 73b onto the surface of the band saw blade 5 to blow off or actively evaporate an adhering fluid component to bring the surface into a dried state.

The band saw machine 91 does not have to be the one that twist the band saw blade 5. In other words, the band saw machine 91 does not have to include the twist units 33 and 34.

The band saw machine 91 may be of a horizontal type in which the axes CL31 and CL32 forms an angle in the vertical direction or close to the vertical direction.

UNITED STATES DESIGNATION

In connection with United States designation, the present international patent application claims the benefit of priority under 35 U.S.C. 119(a) to Japanese Patent Application No. 2022-186458 filed on Nov. 9, 2020, the disclosed contents of which are cited herein.

The invention claimed is:

1. A band saw machine for use in a minimum quantity lubrication method of cutting a workpiece, the band saw machine comprising:
    a first wheel and a second wheel arranged lower than the first wheel, the first wheel and the second wheel being configured to apply a tension to a band saw blade for tracking;
    a first supply unit having an ejection port and arranged between the first wheel and a workpiece cutting position along a travelling direction from the second wheel toward the first wheel in a rotary travel path of the band saw blade and configured to spray a cutting fluid in a mist onto a tooth part of the band saw blade through the ejection port, wherein the ejection port is arranged facing the front of the tooth part;
    a second supply unit arranged between the workpiece cutting position and the second wheel and configured to pour or spray the cutting fluid or a fluid for cooling over the band saw blade; and
    a removal unit arranged in a section of the band saw blade from a contact end edge of the second wheel to a contact start edge of the first wheel and arranged between the contact end edge of the second wheel and the first supply unit in the rotary travel path of the band saw blade, the removal unit being configured to remove a deposit adhering to the band saw blade.

2. The band saw machine according to claim 1, wherein the removal unit is configured to remove the deposit by relatively sliding a scraper or by spraying a gas that does not contain the cutting fluid with respect to a surface of the band saw blade that is traveling.

3. A minimum quantity lubrication method of cutting a workpiece by a band saw machine including a first wheel and a second wheel arranged lower than the first wheel, the first wheel and the second wheel being configured to apply a tension to a band saw blade for tracking, the method comprising:
    cooling the band saw blade by spraying a cutting fluid in a mist onto a tooth part of the band saw blade at a first supply unit between the first wheel and a workpiece cutting position along a travelling direction from the second wheel toward the first wheel in a rotary travel path of the band saw blade;
    cooling the band saw blade by pouring or spraying the cutting fluid or a fluid for cooling over the band saw blade at a second supply unit between the workpiece cutting position and the second wheel; and
    removing a deposit adhering to the band saw blade by a scraper provided in a section from a contact end edge of the second wheel to a contact start edge of the first wheel and from the contact end edge of the second wheel to the first supply unit.

* * * * *